United States Patent
Huang et al.

(10) Patent No.: US 11,647,394 B2
(45) Date of Patent: May 9, 2023

(54) WIRELESS COMMUNICATION SYSTEM, GROUP MANAGEMENT METHOD AND CHANNEL SELECTION METHOD THEREOF

(71) Applicant: ARCADYAN TECHNOLOGY CORPORATION, Hsinchu (TW)

(72) Inventors: Kuo Shu Huang, Hsinchu (TW); Kenchih Chen, Hsinchu (TW); Chun-Ping Chen, Hsinchu (TW); Tsung-Hsien Hsieh, Hsinchu (TW)

(73) Assignee: ARCADYAN TECHNOLOGY CORPORATION, Hsinchu (TW)

( * ) Notice: Subject to any disclaimer, the term of this patent is extended or adjusted under 35 U.S.C. 154(b) by 181 days.

(21) Appl. No.: 17/376,974

(22) Filed: Jul. 15, 2021

(65) Prior Publication Data
US 2022/0167175 A1   May 26, 2022

(30) Foreign Application Priority Data
Nov. 26, 2020   (TW) .................................. 109141602

(51) Int. Cl.
| | |
|---|---|
| *H04W 16/10* | (2009.01) |
| *H04W 72/02* | (2009.01) |
| *H04W 72/04* | (2023.01) |
| *H04W 84/12* | (2009.01) |
| *H04W 72/0453* | (2023.01) |

(52) U.S. Cl.
CPC ........... *H04W 16/10* (2013.01); *H04W 72/02* (2013.01); *H04W 72/0453* (2013.01); *H04W 84/12* (2013.01)

(58) Field of Classification Search
CPC ..... H04W 16/10; H04W 16/14; H04W 72/02; H04W 72/0453; H04W 84/12; H04W 24/00; H04W 88/08
See application file for complete search history.

(56) References Cited

U.S. PATENT DOCUMENTS

| | | | | |
|---|---|---|---|---|
| 2002/0176437 A1* | 11/2002 | Busch | ................... | H04W 16/10 370/437 |
| 2002/0181417 A1* | 12/2002 | Malhotra | .............. | H04W 72/02 370/252 |

(Continued)

*Primary Examiner* — Omer S Mian
*Assistant Examiner* — Hicham B Foud
(74) *Attorney, Agent, or Firm* — Lin & Associates Intellectual Property, Inc.

(57) ABSTRACT

A wireless communication system using wireless LAN channels for wireless communication is disclosed, comprising: master access point, slave access points, and computing unit. First, the master access point creates a collision record table and a usage time record table. After that, the master access point updates the collision record table and usage time record table based on the usage information, and transmits the collision record table and usage time record table to the slave access points. The computing unit generates the channel collision probability through the number of collisions, and calculates the usage weight of the dynamic frequency selection channel through the channel collision probability. Finally, the wireless communication system automatically selects the wireless LAN channels of the master access point and the slave access points according to the usage weight and usage time record table. As such, the wireless communication system has high efficiency and low delay.

10 Claims, 4 Drawing Sheets

(56) References Cited

U.S. PATENT DOCUMENTS

| | | | |
|---|---|---|---|
| 2005/0213554 A1* | 9/2005 | Ginzburg | H04L 1/0003 370/349 |
| 2009/0092101 A1* | 4/2009 | Busch | H04W 16/10 370/332 |
| 2013/0121272 A1* | 5/2013 | Barbieri | H04W 72/54 370/329 |
| 2018/0212827 A1* | 7/2018 | Eryigit | H04W 28/0252 |

* cited by examiner

WIRELESS COMMUNICATION SYSTEM, GROUP MANAGEMENT METHOD AND CHANNEL SELECTION METHOD THEREOF

CROSS-REFERENCE TO RELATED APPLICATION

This application claims the priority of Taiwanese patent application No. 109141602, filed on Nov. 26, 2020, which is incorporated herewith by reference.

BACKGROUND OF THE INVENTION

1. Field of the Invention

The present invention relates generally to a wireless communication system, and more particularly, to a group management for dynamic frequency selection channels and a channel selection method for wireless communication systems.

2. The Prior Arts

In recent years, optical fiber and WiFi have become the mainstream for network connection. With the rapid development of the Internet, Wi-Fi has almost become an indispensable part of network life, whether a tourist attraction, a corporate office or a household. WiFi has penetrated into every aspect of daily lives silently. It is worth noting that WiFi 4, commonly available today, usually supports both 2.4 GHz and 5 GHz, while WiFi 5 supports 5 GHz channels.

With the widespread adoption of wireless networks and the demand for bandwidth, almost all routers on the market currently provide 2.4 GHz and 5 GHz, and almost all smartphones on the market now support dual-band 2.4 GHz and 5 GHz. The 2.4 GHz channel can provide a larger range, but the signal is weaker; while the 5 GHz channel can provide a stronger and faster signal, the disadvantage is that the transmission distance is short, and any obstacles, such as, walls, in the transmission range will have a greater impact on the 5 GHz channel because the signal will decay faster at higher frequencies.

However, because the 2.4 GHz channel has the advantages of saving power and larger range compared with the 5 GHz channel in use, many wireless devices, such as wireless mice, microwave ovens, and USB3.0, use the 2.4 GHz channel for operation. Pairing and connection often cause congestion in the 2.4 GHz channel, which causes inconvenience and delay in connection. Therefore, to improve the quality and speed of the network connection, the user starts to choose using 5 GHz channel when the network connection is made.

It should be noted that the number of wireless local area network (LAN) channels in the 5 GHz channel has increased significantly compared to the 2.4 GHz channel, but a large part is the dynamic frequency selection channel (DFS channel). The so-called dynamic frequency selection channel refers to the overlap between the channels operated by regulatory radars of military or meteorological purpose and wireless LAN channels. Based on security considerations, when wireless communication equipment uses these overlapping wireless LAN channels, it is necessary to ensure that the channels used by regulatory radars are not interfered by wireless signals. Therefore, wireless communication equipment must have the function of dynamic frequency selection (DFS). In the present disclosure, these channels having function of dynamic frequency selection are called the dynamic frequency selection channel. The wireless communication equipment must use the dynamic frequency selection function to select the wireless LAN channel to operate in. Also, the wireless communication equipment must avoid the channel where the regulatory radar works when colliding with the regulatory radar.

However, under the regulations, whenever the wireless communication system 100 collides with the regulatory radar in the dynamic frequency selection channel, the wireless communication device must wait for 30 minutes, which causes inconvenience and delay in use. On the other hand, if these dynamic frequency selection channels are discarded and not used, the number of wireless LAN channels that can be used in the 5 GHz channel will be greatly reduced, which will cause more congestion and slowdown in the use of other wireless LAN channels.

Therefore, the present invention is developed to address the aforementioned deficiencies.

SUMMARY OF THE INVENTION

A primary objective of the present invention is to provide a wireless communication system that can perform group management for dynamic frequency selection channels, so that the wireless communication system can reduce the use of dynamic frequency selection channels that are likely to collide with regulatory radars, and give priority to the dynamic frequency selection channel currently being used by the wireless communication system to reduce the delay and jumping channel caused by collision when the wireless communication system of the present invention uses the dynamic frequency selection channel, thereby enhancing the user experience and greatly reducing the delay time.

Another objective of the present invention is to provide a wireless communication system, which can automatically select the master access point and the wireless local area network channel used by these access points, and skip the channel availability check (CAC) without violating the current laws and regulations to improve the performance of the wireless communication system of the present invention using wireless communication in the local area network.

To achieve the above objectives, the present invention provides a wireless communication system that uses a plurality of wireless local area network channels for wireless communication, the wireless local area network channels include a plurality of dynamic frequency selection channels, and the wireless communication system includes: a master access point, for creating collision record table and a usage time record table, wherein the collision record table containing a plurality of numbers of collisions, the usage time record table contains a plurality of usage times; a plurality of slave access points, coupled to the master access point, the slave access points reporting to the master access point a plurality of usage information on using the dynamic frequency selection channels, the plurality of usage information comprising the plurality of numbers of collisions and the plurality of usage times; and a computing unit, coupled to the master access point, the computing unit generating a plurality of channel collision probabilities according to the numbers of the collisions, and calculating a plurality of usage weights of the dynamic frequency selection channels according to the channel collision probabilities; wherein the master access point updating the collision record table and the usage time record table based on the usage information, and transmitting the collision record table and the usage time record table to the slave access points; the wireless communication system automatically selecting the wireless local area network channel of the master access point and the slave access points based on the usage weight and the usage time record table.

Preferably, according to the wireless communication system of the present invention, the computing unit is built in a cloud server.

Preferably, the wireless communication system according to the present invention is a mesh local area network, and the slave access points are connected to one another through one or a combination of a wireless network and an Ethernet network.

Preferably, according to the wireless communication system of the present invention, the computing unit comprises a processing unit, a memory, and a transceiver unit, wherein the processing unit reads a usage weight program in the memory and executes to calculate the usage weights of the dynamic frequency selection channels through the collision probability of the channels.

Preferably, according to the wireless communication system of the present invention, the master access point is one of a gateway, a hotspot, and a bridge.

Preferably, according to the wireless communication system of the present invention, the slave access points are one or a combination of gateways, hotspots and bridges.

Preferably, according to the wireless communication system of the present invention, the wireless communication system performs a channel availability check on the dynamic frequency selection channels.

Preferably, according to the wireless communication system of the present invention, the wireless communication system skips channel availability check on the dynamic frequency selection channel currently used by the wireless communication system among the dynamic frequency selection channels according to the usage time record table.

In addition, to achieve the aforementioned objectives, the present invention, based on the aforementioned wireless communication system, further provides a group management method for the aforementioned wireless communication system, comprising: the master access point creating the collision record table and the usage time record table; each of the slave access points connecting to the master access point, so that the collision record table and the usage time record table adding one row; when the master access point or the slave access points using the dynamic frequency selection channel and colliding with the regulatory radar or detecting an error when executing channel availability check by the channel, updating the collision record table; when the channel availability check executed by the channel being correct and the master access point or the slave access points using the dynamic frequency selection channel, updating the usage time record table; and when the slave access points stop using of the dynamic frequency selection channel, updating the usage time record table.

Moreover, to achieve the aforementioned objectives, the present invention, based on the above-mentioned wireless communication system, further provides a channel selection method of the aforementioned wireless communication system, comprising: activating the wireless communication system, able to use the wireless local area network channels; the computing unit generating the collision probabilities of the channels based on the number of collisions, and calculating the usage weights of the dynamic frequency selection channels through the collision probabilities of the channels; the wireless communication system selecting one of the wireless local area network channels according to the usage weights; determining whether the wireless local area network channel being a dynamic frequency selection channel; when the wireless local area network channel being not a dynamic frequency selection channel, the wireless communication system selecting the wireless local area network channel; when the wireless local area network channel being a dynamic frequency selection channel, based on the usage time record table, the wireless communication system determining whether the dynamic frequency selection channel being the dynamic frequency selection channel currently used by the wireless communication system; when the dynamic frequency selection channel being the dynamic frequency selection channel currently used by the wireless communication system, the wireless communication system selecting the wireless local area network channel; when the dynamic frequency selection channel being not the dynamic frequency selection channel currently used by the wireless communication system, performing a channel availability check; when the channel availability being correct, the wireless communication system selecting the wireless local area network channel; and when the channel availability check being failed, the wireless communication system re-selecting from the wireless local area network channels.

In summary, the wireless communication system, group management method, and channel selection method provided by the present invention mainly use the wireless communication system of the present invention with the group management method and channel selection method for dynamic frequency selection channel group management, so that the wireless communication system can reduce the use of dynamic frequency selection channels that are likely to collide with regulatory radars, and give priority to the use of dynamic frequency selection channels currently in use by the wireless communication system, while comply with current regulations by skipping the channel availability check. The wireless communication system of the present invention can improve the performance of the wireless communication in the local area network, and reduce the delay caused by collision and the delay time caused by jumping channel.

To enable those skilled in the art to understand the purpose, features, and effects of the present invention, the following specific embodiments and accompanying drawings are used to describe the present invention in detail as follows.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
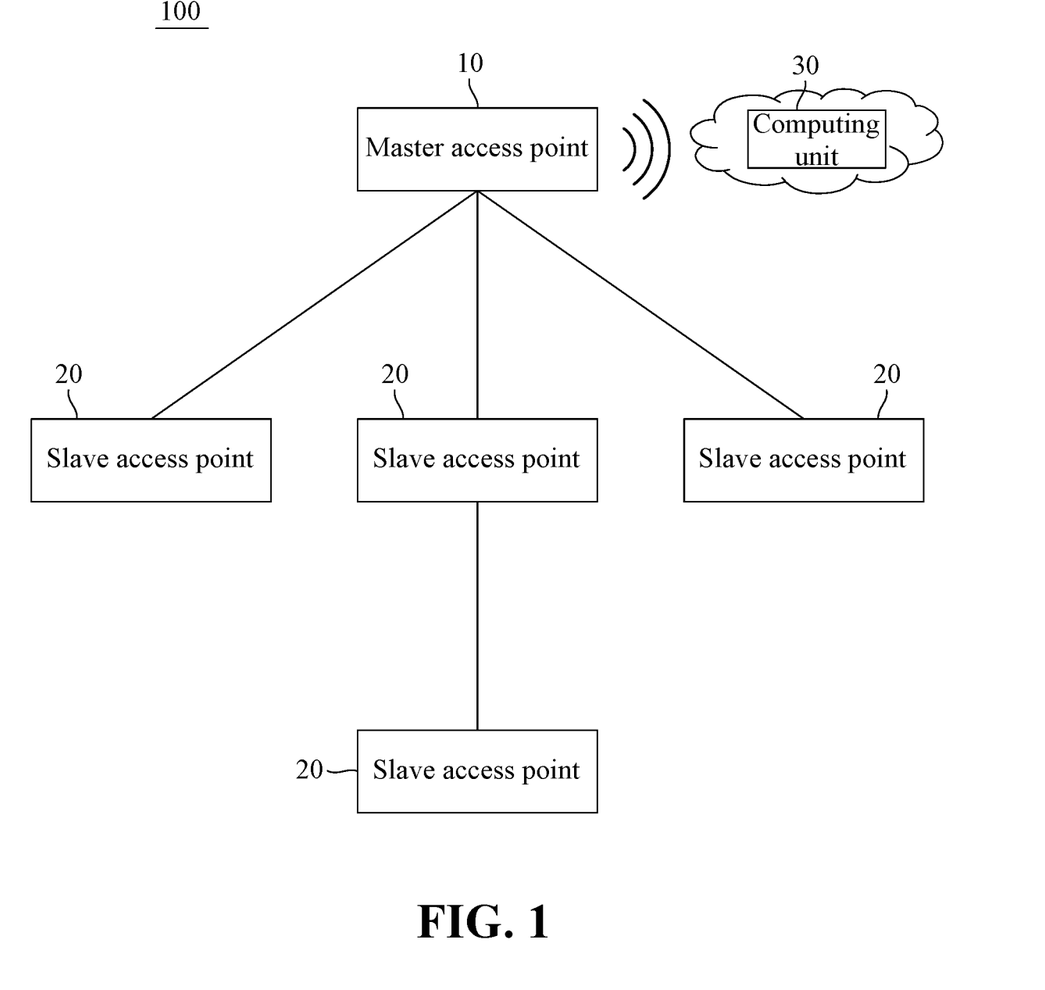
FIG. 1 is a schematic view showing a wireless communication system according to an embodiment of the present invention.

Referring to FIG. 1, FIG. 1 is a schematic view showing a wireless communication system according to an embodiment of the present invention. As shown in FIG. 1, the wireless communication system 100 according to the present invention includes: a master access point 10, a slave access point 20 and a computing unit 30.

Specifically, in the present embodiment, the wireless communication system 100 uses wireless local area network channels for wireless communication under a mesh network architecture, where the wireless local area network channels include dynamic frequency selection channels (DFS), but the present invention is not limited to the above.

Specifically, in the present embodiment, the master access point 10 and the slave access point 20 of the present invention can be one or a combination of gateways, hotspots, and bridges, and under the mesh network architecture, each slave access point 20 can be connected to each other and connected to each other through wireless network (WiFi™), Ethernet, or power line communication (PLC), etc. However, in actual application, the number and topology of the master access point 10 and the slave access point 20 of the present invention are not limited to the above.

It should be noted that, although the above description is based on the wireless communication system 100 in the mesh network architecture, the present invention is not limited to the above. The method of performing specific functions and selecting dynamic frequency selection channels operates in a wireless communication system 100 comprising a master access point 10 and a plurality of slave access points 20, and is not limited to any specific network topology, such as star, ring, tree or mesh, and so on, can be used as the network architecture of the wireless communication system 100.

Refer to Table 1 and Table 2 below. Table 1 is an exemplary schematic table of the collision record table of the embodiment of the present invention at a certain time; Table 2 is an exemplary schematic table of the usage time record table of the embodiment of the present invention at a certain time. In the present embodiment, the master access point 10 in the present invention creates a collision record table (Table 1) and a usage time record table (Table 2), wherein the collision record table includes the number of collisions, and the usage time record table includes the usage time. It should be noted that, in the present embodiment, the unit of the usage time recording table is in minutes, but here Table 1 and Table 2 are only exemplary schematic tables at a certain time, and the present invention is not limited to the exemplar.

TABLE 1

| DFS channel Device | 52 | 56 | 60 | 64 | ... | 144 |
|---|---|---|---|---|---|---|
| total | 1 | 1 | 1 | 2 | | 0 |
| GW | 1 | | | 1 | | |
| EX1 | | 1 | | 1 | | |
| EX2 | | | 1 | | | |
| ... | | | | | | |
| EXn | | | | | | |

TABLE 2

| DFS channel Device | 52 | 56 | 60 | 64 | ... | 144 |
|---|---|---|---|---|---|---|
| total | 30 | | | 20 | | 60 |
| GW | 30 | | | | | |
| EX1 | | | | 10 | | |
| EX2 | | | | 10 | | 60 |
| ... | | | | | | |
| EXn | | | | | | |

For example, as shown in Table 1, the collision record table at a certain time wherein the total number of collisions of the dynamic frequency selection channel on channel 52 is 1, and the total number of collisions of the dynamic frequency selection channel on channel 64 is 2, and so on. The number of collisions of each dynamic frequency selection channel and the total number of collisions at a certain time can be obtained accordingly. As shown in Table 2, the usage time record table at a certain time, wherein the total usage time of the dynamic frequency selection channel on channel 52 is 30 minutes, and the total usage time of the dynamic frequency selection channel on channel 64 is 20 minutes. Similarly, the usage time of each dynamic frequency selection channel and the total usage time at a certain time can be obtained.

It should be further noted that under the mesh network architecture, the slave access point 20 can report the usage information (not shown) of the dynamic frequency selection channel to the master access point 10. The usage information includes the number of collisions and usage time. Wherein, the number of collisions is the number of times that the wireless communication system 100 collides with the regulatory radar on the selected dynamic frequency selection channel. Whenever there is a collision with the regulatory radar, the collision is reported from the slave access point 20 to the master access point 10. The master access point 10 will update the collision record table, and the master access point 10 will return the updated collision record table to the slave access point 20. The usage time represents the time that the master access point 10 and the slave access point 20 use the selected dynamic frequency selection channel. When the wireless communication system 100 uses a dynamic frequency selection channel, the slave access point 20 reports to the master access point 10, and a usage time record table is established by the master access point 10 to record the usage status of each dynamic frequency selection channel. When each dynamic frequency selection channel starts to be used, the usage is reported from the slave access point 20 to the master access point 10 to record the usage time, and the usage status is updated periodically until the dynamic frequency selection channel used by the wireless communication system 100 collides with the regulatory radar, or the wireless communication system 100 disconnects the dynamic frequency selection channel being used, then the master access point 10 updates the usage time record table. As such, the usage time is used to determine whether the master access point 10 and the slave access point 20 are currently using the dynamic frequency selection channel.

Accordingly, the above description shows that the wireless communication system 100 provided by the present invention creates a collision record table and a usage time record table to perform group management for dynamic frequency selection channels, so that the wireless communication system 100 of the present invention can reduce the use of dynamic frequency selection channels that are likely to collide with regulatory radars through the collision record table and the usage time record table, and preferentially use the dynamic frequency selection channels being currently used by the wireless communication system 100 to reduce the delay and jump caused by collision with the regulatory radar when the wireless communication system 100 of the present invention uses a dynamic frequency selection channel, so as to improve the user experience and greatly reduces the delay time.

Figure 2:
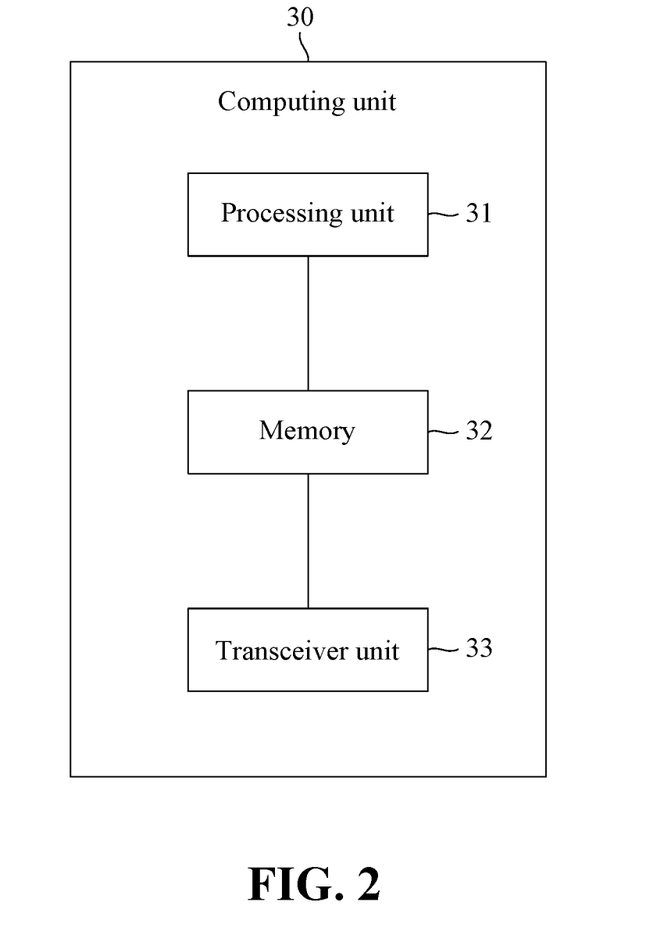
FIG. 2 is a schematic view showing the computing unit of a wireless communication system according to another embodiment of the present invention.

Referring to FIGS. 1 and 2. FIG. 2 is a schematic view showing a computing unit of a wireless communication system according to another embodiment of the present invention. As shown in FIG. 1, the computing unit 30 is coupled to the master access point 10. The computing unit 30 generates the channel collision probability weightA based on the number of collisions, and calculates the channel's usage weight ChannelSelect of the dynamic frequency selection channel based on the channel collision probability, so that the wireless communication system 100 can automatically select the wireless local area network channel of the master access point and the slave access point according to the usage weights and the usage time record table. The computing unit 30 can build in a cloud server, and connected to the master access point 10 through, such as, one of the wireless communication protocols of Bluetooth, third-generation mobile communications (3G), fourth-generation mobile communications (4G), wireless LAN (WiFi), and fifth-generation mobile communications (5G), to obtain the collision record table and the usage time record table, but the present invention is not limited to the above.

Specifically, as shown in FIG. 2, the computing unit 30 includes a processing unit 31, a memory 32, and a transceiver unit 33. The processing unit 31 reads and executes a usage weight program in the memory 32 to calculate the usage weights of the dynamic frequency selection channels based on the channel collision probabilities.

Specifically, refer to the following program code 1, which is a program code describing the execution of the usage weight program of another embodiment of the present invention. As shown in program code 1, in the present embodiment, the time unit is in minutes. The startup time of the wireless communication system 100 is defined as the parameter Time_a, the current time is defined as the parameter Time_bx, and the update time is defined at 0:00 every day. The update period parameter UpdateInterval is defined as 24 hours, the current time of the wireless communication system 100 is defined as the parameter Time_c, the collision probability is defined as the parameter weightA, the historical collision probability is defined as the parameter weightA^, and the usage weight is defined as the parameter ChannelSelect. It is worth noting that in the code 401, each time the wireless communication system 100 collides with the regulatory radar in the dynamic frequency selection channel, under the regulations, the wireless communication system 100 needs to wait for 30 minutes. Therefore, in the code 401, the parameter NOPtime is defined as 30. The wireless communication system 100 uses this feature to generate the channel collision probability weightA with the computing unit 30 based on the number of collisions, and then calculates the usage weight of the dynamic frequency selection channel based on the channel collision probability weightA. However, the present invention is not limited to the above.

Program Code 1
Time Unit m (minute)
System Start Time Time_a
System Current Time Time_c
NOPtime=30/* . . . 401*/
Time_bx, weightA Specifically, refer to the program code 2. The program code 2 is a program code for executing the usage weight program of another embodiment of the present invention. As shown in program code 2, when the wireless communication system 100 is turned on before the update time (x=0) or the system reaches the update time (x=1), execute the following respectively: when the historical collision probability weightA^ of the channel is 0, the current time Time_bx is set to the current time Time_c of the wireless communication system 100, and execute the code 402 to calculate the channel collision probability weightA; or when the channel's historical collision probability weightA^ is not 0, execute the code 403 to calculate the channel collision probability weightA, and finally execute the code 404 to update the calculated collision probability weightA to the historical collision probability weightA^, but the present invention is not limited to the above.

Program Code 2
x=0, update x=1 (Time_c=Time b1)
If(WeightA^=0)
WeightA=HitCount0*NOPtime/(Time_c−Time_a)/* . . . 402*/
Else
WeightA=½*WeightA^+½ *HitCount0*30/(Time_c−Time_a)/* . . . 403*/
WeightA^=WeightA/* . . . 404*/

Refer to the program code 3 below. The program code 3 is a program code executing the usage weighting program of another embodiment of the present invention. As shown in the program code 3, when the wireless communication system 100 is turned on for longer than the update time (x>=2), the code 405 is executed to calculate the channel collision probability weightA, and finally the code 406 is executed to update the channel calculated collision probability weightA to the historical collision probability weightA^, but the present invention is not limited to the above.

Program code 3
update x>=2
WeightA=½ *WeightA^+½ *HitCountX*NOPtime/(UpdateInterval*2*NOPtime)/* . . . 405*/
WeightA^=WeightA/* . . . 406*/

It should be further noted that, in the present embodiment, when the historical collision probability weightA^ of the channel is not 0, the code 403 calculates the channel collision probability weightA, wherein the historical collision probability is multiplied by ½ to reduce the influence of the historical collision probability weightA^ on the usage weight of the channel, so as to ensure that the wireless communication system 100 of the present invention will not select the dynamic frequency selection channel that the regulatory radar is using, and prevent the delay and jump caused by the collisions with the regulatory radar, thus, enhance the user experience and greatly reduce the delay time. It is worth noted that the user can choose any weight ratio according to application needs, and the present invention is not limited to the above.

However, the present invention is not limited to the above embodiment. Refer to the following program code 4, which is a program code illustrating exemplary execution of the weighting program of another embodiment of the present invention. In another embodiment of the present invention, the update period UpdateInterval for calculating the collision probability of the wireless communication system 100 is not 24 hours. Instead, an arbitrary update period UpdateInterval can be defined according to the application needs by the user, as shown in program code 4. When the wireless communication system 100 is turned on for more than the update time (x>=1), the code 407 is executed to calculate the channel collision probability weightA, but the invention is not limited to the present embodiment.

Program code 4
x>=1
WeightA=½ *WeightA^+½ *HitCount*NOPtime/(Time_c-Time_bX)/* . . . 407*/

Refer to the following program code 5, which is a program code illustrating exemplary execution of the weighting program of yet another embodiment of the present invention. After executing the above program code, the wireless communication system 100 calculates the collision probability weightA of each of these wireless LAN channels through the computing unit 30, and at the same time, according to the calculation method set by different equipment vendors to define a parameter ChannelCore. Finally, the computing unit 30 executes the code 408 from the collision probability weightA and the parameter Channel-Core to calculate the usage weight ChannelSelect of each of these wireless local area network channels. Finally, the code 409 is executed. The wireless communication system 100 of the present invention selects the wireless LAN channel with the largest weight ChannelSelect as the dynamic frequency selection channel to use, so the wireless communication system 100 can select the wireless LAN channel with the higher weight as the alternative wireless LAN channel. More specifically, the wireless communication system 100 of the present invention can effectively avoid the dynamic frequency selection channels that have higher probability to collide with regulatory radars, so as to improve the performance of the wireless communication system 100 of the present invention, but the invention is not limited to the present embodiment.

Program code 5
ChannelCore/* . . . calculation methods set by different equipment vendors can be used to be compatible with products available in the market.*/Channel Select=ChannelCore*(1-weightA)/* . . . 408*/
Select MAX(ChannelSelect) as the channel/* . . . 409*/

Refer to the following program code 6, which is a program code that illustrates exemplary execution of the weighting program of another embodiment of the present invention. The wireless communication system 100 of the present invention can further execute the code 410, which is based on the ratio between the usage time ChannelTime of the dynamic frequency selection channel and the system time SystemTime of the wireless communication system 100 to determine the actual usage time of the dynamic frequency selection channel, to generate the actual time and the usage probability WeightC of the dynamic frequency selection channel, and then execute the code 411 to calculate each of the wireless LAN channels, the usage weight ChannelSelect generated according to the usage probability WeightC of the dynamic frequency selection channel, and finally execute the code 412, wherein the wireless communication system 100 of the present invention selects the wireless LAN channel with the largest usage weight ChannelSelect as the dynamic frequency selection channel to be used, but the invention is not limited to the present embodiment.

Program code 6
WeightC=1+(Channel Time/System Time)/* . . . 410*/
Channel Select=ChannelCore*WeightC /* . . . 411*/
Select MAX(ChannelSelect) as the channel/* . . . 412*/

Refer to the following program code 7, which is a program code illustrating exemplary execution of the weighting program of another embodiment of the present invention. After executing the above code, the wireless communication system 100 can further execute the code 413, which can combine the collision probability weightA of the wireless LAN channel and the usage probability WeightC of the dynamic frequency selection channel to calculate the usage weight wireless Channel Select generated by the combination of the collision probability weightA and the use probability WeightC for each wireless LAN channel, tand finally the code 414 is executed, wherein the wireless communication system 100 of the present invention selects the wireless LAN channel with the largest use weight ChannelSelect as the dynamic frequency selection channel to be used, but the present invention is not limited to the above.

Program code 7
Channel Select=ChannelCore*(1-weightA)*WeightC/* . . . 413*/
Select MAX(ChannelSelect) as the channel/* . . . 414*/

Figure 3:
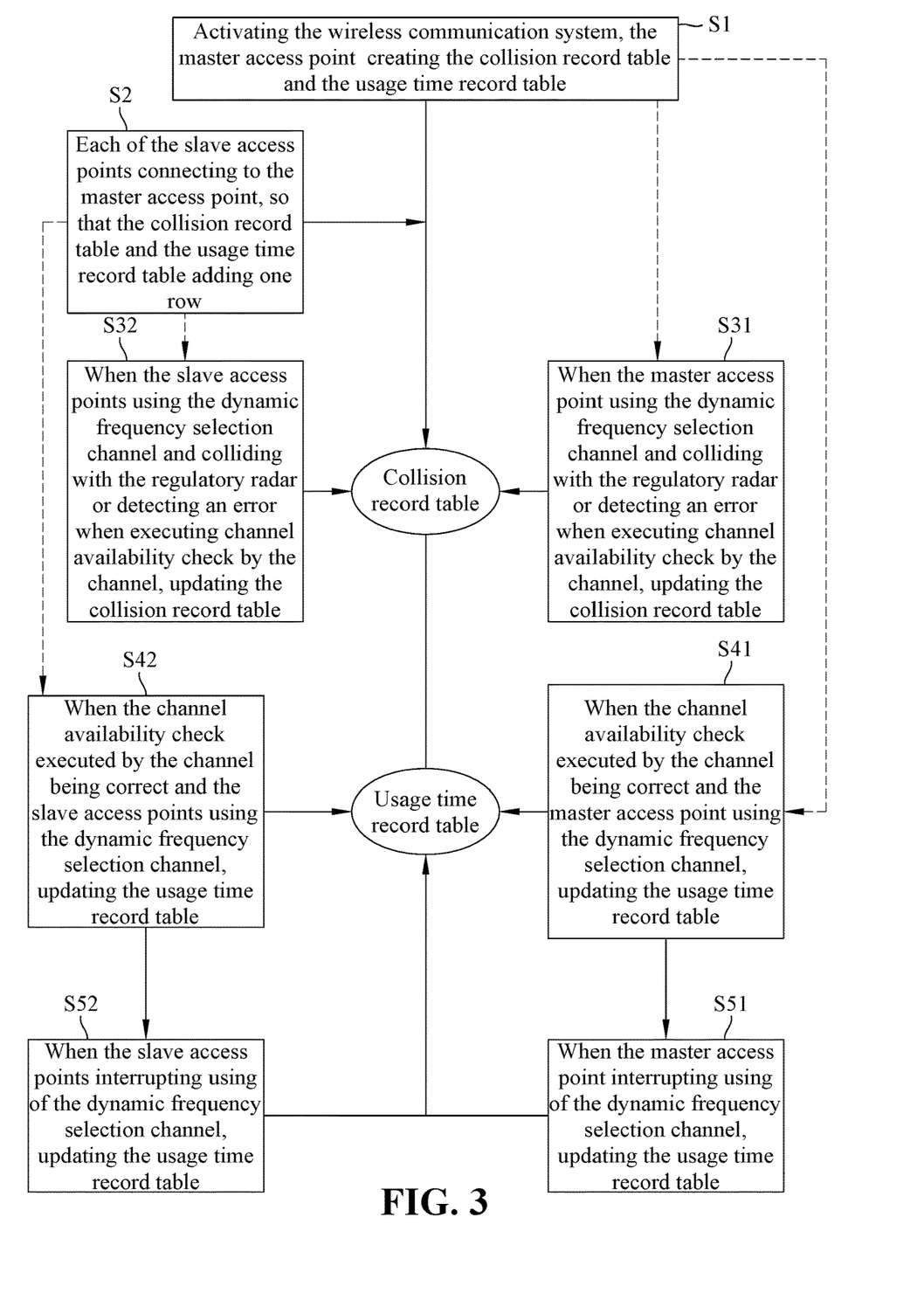
FIG. 3 is a flowchart illustrating the steps of a group management method for a wireless communication system according to an embodiment of the present invention.

To provide a further understanding of the structural features, the use of technical means and the expected effects of the present invention, the following describes the use of the present invention. It is believed that a deeper and specific understanding of the present invention can be obtained from the description, as follows:

Refer to FIG. 3, in conjunction with FIG. 1 and FIG. 2. FIG. 3 is a flowchart illustrating the steps of the group management method of the wireless communication system according to the embodiments of the present invention. Based on the wireless communication system 100 of the above embodiments, the present invention further provides a group management method of the wireless communication system 100, which includes the following steps:

Step S1: activating the wireless communication system 100, the master access point 10 creating the collision record table and the usage time record table;

Step S2: each of the slave access points 20 connecting to the master access point 10, so that the collision record table and the usage time record table adding one row;

Step S31: when the master access point 10 using the dynamic frequency selection channel and colliding with the regulatory radar or detecting an error when executing channel availability check by the channel, updating the collision record table;

Step S32: when the slave access points 20 using the dynamic frequency selection channel and colliding with the regulatory radar or detecting an error when executing channel availability check by the channel, updating the collision record table;

Step S41: when the channel availability check executed by the channel being correct and the master access point 10 using the dynamic frequency selection channel, updating the usage time record table;

Step S42: when the channel availability check executed by the channel being correct and the slave access points 20 using the dynamic frequency selection channel, updating the usage time record table;

Step S51: when the master access point 10 stops using of the dynamic frequency selection channel, updating the usage time record table.

Step S52: when the slave access points 20 stops using of the dynamic frequency selection channel, updating the usage time record table.

Thereby, the wireless communication system 100 of the present invention can perform group management for dynamic frequency selection channels, so that the wireless communication system 100 can reduce the use of dynamic frequency selection channels that are prone to collision with regulatory radars, and give priority to use the dynamic frequency selection channel being currently used by the wireless communication system 100 to reduce the delay and jump caused by collision when the wireless communication system 100 of the present invention uses the dynamic frequency selection channel, thereby enhancing the user experience and greatly reducing the delay time.

Figure 4:
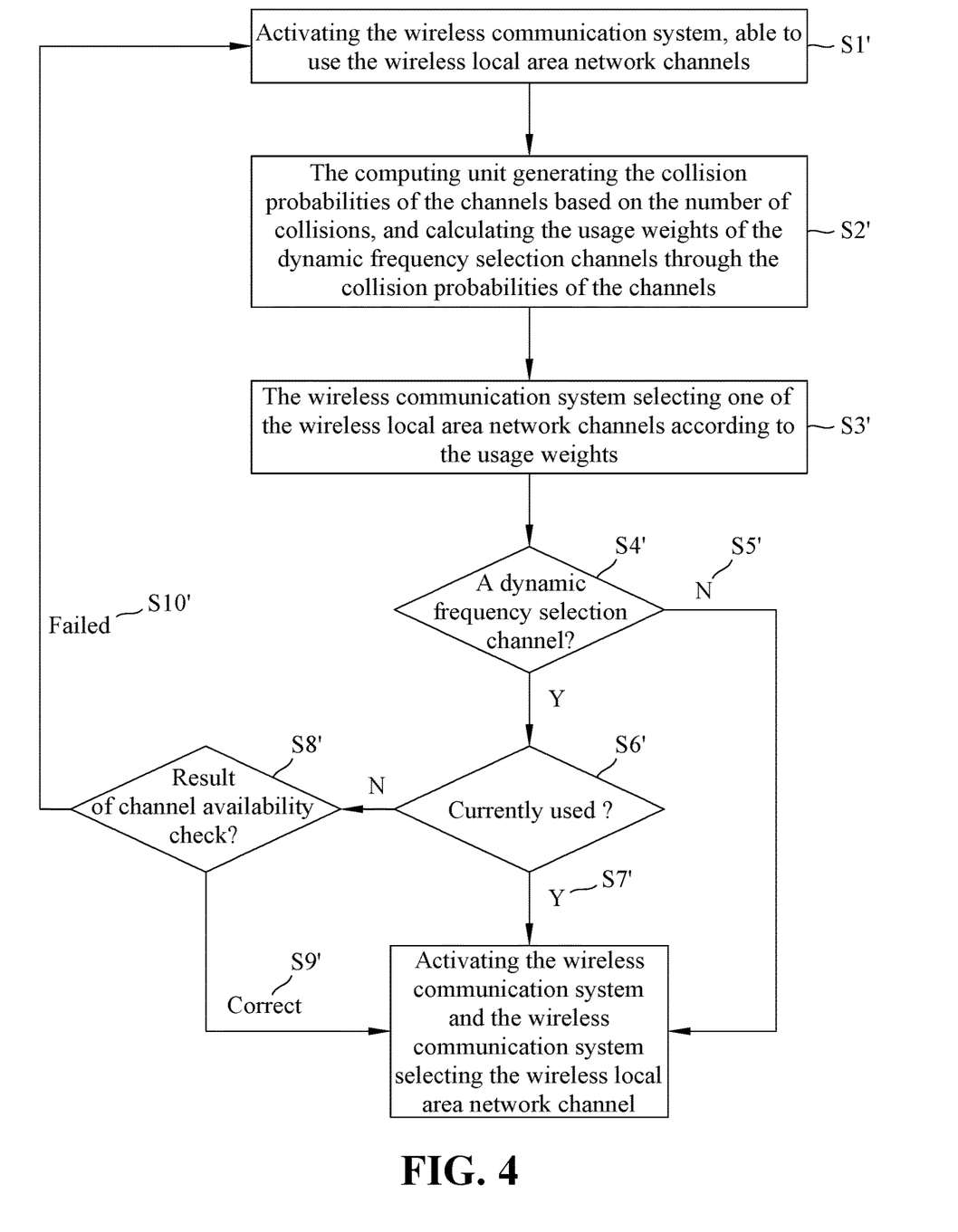
FIG. 4 is a flowchart illustrating the steps of a method for channel selection in a wireless communication system according to another embodiment of the present invention.

Refer to FIG. 4, in conjunction with FIGS. 1-3. FIG. 4 is a flowchart illustrating the steps of a channel selection method for a wireless communication system of another embodiment of the present invention. Based on the wireless communication system 100 of the above embodiments, the present invention further provides a channel selection method of the wireless communication system, which includes the following steps:

Step S1': activating the wireless communication system 100, the wireless communication system 100 being able to use each of the wireless local area network channels; the wireless local area network channels comprising: dynamic frequency selection channels;

Step S2': the computing unit 30 generating the collision probabilities weightA of the channels based on the number of collisions, and calculating the usage weights ChannelSelect of the dynamic frequency selection channels through the collision probabilities weightA of the channels;

Step S3': the wireless communication system 100 selecting one of the wireless local area network channels according to the usage weights ChannelSelect;

Step S4': the wireless communication system 100 determining whether the wireless local area network channel being a dynamic frequency selection channel;

Step S5': when the wireless local area network channel being not a dynamic frequency selection channel, the wireless communication system 100 selecting the wireless local area network channel;

Step S6': when the wireless local area network channel being a dynamic frequency selection channel, based on the usage time record table, the wireless communication system 100 determining whether the dynamic frequency selection channel being the dynamic frequency selection channel currently used by the wireless communication system 100;

Step S7': when the dynamic frequency selection channel being the dynamic frequency selection channel currently used by the wireless communication system 100, the wireless communication system 100 selecting the wireless local area network channel;

Step S8': when the dynamic frequency selection channel being not the dynamic frequency selection channel currently used by the wireless communication system 100, performing a channel availability check;

Step S9': when the channel availability being correct, the wireless communication system 100 selecting the wireless local area network channel;

Step S10': when the channel availability check being failed, the wireless communication system 100 re-selecting from the wireless local area network channels.

It should be further noted that, according to the wireless communication system 100 of the present invention, in conjunction with the above channel selection method, under the permission by laws and regulations, when the wireless communication system 100 starts to use each dynamic frequency selection channel, the slave access point 20 is reported to the master access point 10 to record the usage time and periodically update the usage status until the dynamic frequency selection channel used by the wireless communication system 100 collides with the regulatory radar or the wireless communication system 100 disconnects the dynamic frequency selection channel used, the master access point 10 updates the time record table. Therefore, by usage time, the present invention can be determined whether the master access point 10 and the slave access point 20 are currently using the dynamic frequency selection channel. Through determining whether the master access point 10 and the salve access point 20 are currently using the dynamic frequency selection channel, the present invention can further skip the channel availability check (CAC), so as to reduce the check time of the CAC before using the dynamic frequency selection channel, thereby improving the performance of the wireless communication system 100 of the present invention and reducing the delay caused by collisions and jumps.

As such, the present invention has the following implementation effects and technical effects:

First, based on the wireless communication system 100 of the present invention, the group management for dynamic frequency selection channels can be performed so that the wireless communication system 100 can reduce the use of dynamic frequency selection channels that are prone to collision with regulatory radars, and give priority to the use of the dynamic frequency selection channels being currently used by the wireless communication system 100, to reduce the delay caused by collisions and jumps when the wireless communication system of the present invention uses dynamic frequency selection channels, and improve the user experience and greatly reduce the delay time.

Second, the present invention can further skip the CAC effectively by determining whether the master access point 10 and the slave access point 20 are currently using the dynamic frequency selection channel, so as to reduce the check time for CAC before using the dynamic frequency selection channel before use, thereby enhancing the performance of the wireless communication system 100 of the present invention using wireless communication within the local area network.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A wireless communication system, the wireless communication system using a plurality of wireless local area network channels for wireless communication, the wireless local area network channels comprising a plurality of dynamic frequency selection channels, the wireless communication system comprising:

a master access point, for creating a collision record table and a usage time record table, wherein the collision record table containing a plurality of numbers of collisions, the usage time record table contains a plurality of usage times;

a plurality of slave access points, coupled to the master access point, the slave access points reporting to the master access point a plurality of usage information on using the dynamic frequency selection channels, the plurality of usage information comprising the plurality of numbers of collisions and the plurality of usage times; and a computing unit, coupled to the master access point, the computing unit generating a plurality of channel collision probabilities according to the numbers of the collisions, and calculating a plurality of usage weights of the dynamic frequency selection channels according to the channel collision probabilities;

wherein the master access point updating the collision record table and the usage time record table based on the usage information, and transmitting the collision record table and the usage time record table to the slave access points; the wireless communication system automatically selecting the wireless local area network channel of the master access point and the slave access points based on the usage weight and the usage time record table.

2. The wireless communication system according to claim 1, wherein the computing unit is built in a cloud server.

3. The wireless communication system according to claim 1, wherein the computing unit comprises a processing unit, a memory, and a transceiver unit, wherein the processing unit reads a usage weight program in the memory and executes to calculate the usage weights of the dynamic frequency selection channels through the collision probability of the channels.

4. The wireless communication system according to claim 1, wherein the wireless communication system is a mesh local area network, and the slave access points are connected to one another through one or a combination of a wireless network and an Ethernet network.

5. The wireless communication system according to claim 1, wherein the master access point is one of a gateway, a hotspot, and a bridge.

6. The wireless communication system according to claim 1, wherein the slave access points are one of gateways, hotspots and bridges.

7. The wireless communication system according to claim 1, wherein the wireless communication system performs a channel availability check on the dynamic frequency selection channels.

8. The wireless communication system according to claim 7, wherein the wireless communication system skips channel availability check on the dynamic frequency selection channel currently used by the wireless communication system among the dynamic frequency selection channels according to the usage time record table.

9. A group management method for the wireless communication system according to claim 1, comprising the step of:
    the master access point creating the collision record table and the usage time record table;
    each of the slave access points connecting to the master access point, so that the collision record table and the usage time record table adding one row;
    when the master access point or the slave access points using the dynamic frequency selection channel and colliding with the regulatory radar or detecting an error when executing channel availability check by the channel, updating the collision record table;
    when the channel availability check executed by the channel being correct and the master access point or the slave access points using the dynamic frequency selection channel, updating the usage time record table; and
    when the slave access points stop using of the dynamic frequency selection channel, updating the usage time record table.

10. A channel selection method for the wireless communication system according to claim 1, comprising:
    activating the wireless communication system, able to use the wireless local area network channels;
    the computing unit generating the collision probabilities of the channels based on the number of collisions, and calculating the usage weights of the dynamic frequency selection channels through the collision probabilities of the channels;
    the wireless communication system selecting one of the wireless local area network channels according to the usage weights
    determining whether the wireless local area network channel being a dynamic frequency selection channel;
    when the wireless local area network channel being not a dynamic frequency selection channel, the wireless communication system selecting the wireless local area network channel;
    when the wireless local area network channel being a dynamic frequency selection channel, based on the usage time record table, the wireless communication system determining whether the dynamic frequency selection channel being the dynamic frequency selection channel currently used by the wireless communication system;
    when the dynamic frequency selection channel being the dynamic frequency selection channel currently used by the wireless communication system, the wireless communication system selecting the wireless local area network channel;
    when the dynamic frequency selection channel being not the dynamic frequency selection channel currently used by the wireless communication system, performing a channel availability check;
    when the channel availability being correct, the wireless communication system selecting the wireless local area network channel; and
    when the channel availability check being failed, the wireless communication system re-selecting from the wireless local area network channels.

* * * * *